US009391688B2

(12) United States Patent
Artemenko et al.

(10) Patent No.: US 9,391,688 B2
(45) Date of Patent: Jul. 12, 2016

(54) SYSTEM AND METHOD OF RELAY COMMUNICATION WITH ELECTRONIC BEAM ADJUSTMENT

(71) Applicant: LIMITED LIABILITY COMPANY "RADIO GIGABIT", Moscow (RU)

(72) Inventors: Aleksey Andreevich Artemenko, Nizhny Novgorod (RU); Roman Olegovich Maslennikov, Nizhny Novgorod (RU)

(73) Assignee: RADIO GIGABIT, Moscow (RU)

( * ) Notice: Subject to any disclaimer, the term of this patent is extended or adjusted under 35 U.S.C. 154(b) by 0 days.

(21) Appl. No.: 14/257,687

(22) Filed: Apr. 21, 2014

(65) Prior Publication Data
US 2014/0227966 A1    Aug. 14, 2014

Related U.S. Application Data

(63) Continuation-in-part of application No. PCT/RU2011/000814, filed on Oct. 20, 2011.

(51) Int. Cl.
H04B 7/00 (2006.01)
H04B 7/155 (2006.01)
H01Q 1/12 (2006.01)
(Continued)

(52) U.S. Cl.
CPC ............ *H04B 7/155* (2013.01); *H01Q 1/1257* (2013.01); *H01Q 3/245* (2013.01); *H01Q 25/007* (2013.01)

(58) Field of Classification Search
USPC ................ 455/67.14, 67.15, 561, 562.1, 502
See application file for complete search history.

(56) References Cited

U.S. PATENT DOCUMENTS

| 4,574,287 A | 3/1986 | Waters et al. |
| 5,185,613 A | 2/1993 | Whatmore et al. |
| 5,481,268 A | 1/1996 | Higgins |

(Continued)

FOREIGN PATENT DOCUMENTS

| FR | 2581798 A1 | 11/1986 |
| FR | 2705169 A1 | 11/1994 |

(Continued)

OTHER PUBLICATIONS

International search report for PCT/RU2011/000814 dated Oct. 20, 2011.

(Continued)

Primary Examiner — Fayyaz Alam
(74) Attorney, Agent, or Firm — Sughrue Mion, PLLC

(57) ABSTRACT

The invention relates to millimeter-wave point-to-point communication systems. A system comprises two separated millimeter-wave transceivers which provide high throughput data transmission and reception in frequency duplex mode and use high gain antennas capable of electronic scanning in some continuous angle range provided by the control module that implement control algorithms for antenna radiation pattern. Also a method based on the exploitation of scanning antennas of initial beam directions fine adjustment and subsequent beam directions tracking and readjustment when needed is proposed.

The proposed system and method provide automatic recovery of failed connection in case of relay station orientation change due to influence of various external factors (wind, vibration, different intensity of heating of the bracing mountings at different time of a day and others) and can be used in backhaul systems of base station sites for mobile networks.

22 Claims, 5 Drawing Sheets

(51) Int. Cl.
*H01Q 3/24* (2006.01)
*H01Q 25/00* (2006.01)

(56) References Cited

U.S. PATENT DOCUMENTS

| | | | |
|---|---|---|---|
| 5,486,832 | A | 1/1996 | Hulderman |
| 5,706,017 | A | 1/1998 | Büttgenbach |
| 5,966,103 | A | 10/1999 | Pons et al. |
| 6,034,641 | A | 3/2000 | Kudoh et al. |
| 6,317,096 | B1 | 11/2001 | Daginnus et al. |
| 6,587,699 | B2 | 7/2003 | Olsen et al. |
| 6,590,544 | B1 | 7/2003 | Filipovic |
| 6,859,187 | B2 | 2/2005 | Ohlsson |
| 7,197,337 | B2 * | 3/2007 | Goldberg et al. .......... 455/562.1 |
| 7,642,961 | B1 | 1/2010 | Rausch |
| 7,667,665 | B1 | 2/2010 | Colburn et al. |
| 7,683,844 | B2 | 3/2010 | Alamouti et al. |
| 7,688,263 | B1 | 3/2010 | Oxlet et al. |
| 7,834,803 | B2 | 11/2010 | Weinstein et al. |
| 7,844,217 | B2 | 11/2010 | Charash |
| 8,264,978 | B1 * | 9/2012 | Srinivas et al. ................ 370/252 |
| 9,001,809 | B2 * | 4/2015 | Lea et al. ...................... 370/338 |
| 2002/0164945 | A1 | 11/2002 | Olsen et al. |
| 2003/0022694 | A1 | 1/2003 | Olsen et al. |
| 2004/0072579 | A1 | 4/2004 | Hottinen |
| 2004/0229652 | A1 * | 11/2004 | Goldberg et al. .......... 455/562.1 |
| 2005/0020311 | A1 * | 1/2005 | Goldberg et al. .......... 455/562.1 |
| 2008/0153549 | A1 | 6/2008 | Korevaar et al. |
| 2008/0284655 | A1 | 11/2008 | Alamouti et al. |
| 2009/0007185 | A1 | 1/2009 | Nix et al. |
| 2010/0052987 | A1 | 3/2010 | Weinstein |
| 2011/0095953 | A1 | 4/2011 | Lier |
| 2013/0231059 | A1 * | 9/2013 | Prasad et al. .................. 455/63.4 |

FOREIGN PATENT DOCUMENTS

| | | |
|---|---|---|
| GB | 2459131 A | 10/2009 |
| JP | 201210245 A | 1/2012 |
| RU | 2177662 C1 | 12/2001 |
| RU | 2236073 C2 | 9/2004 |
| RU | 2291527 C2 | 1/2007 |
| RU | 2349007 C1 | 3/2009 |
| RU | 2474045 C2 | 1/2013 |
| RU | 2476015 C2 | 2/2013 |
| WO | 2004051803 A1 | 6/2004 |
| WO | 2004077607 A2 | 9/2004 |
| WO | 2007136289 A1 | 11/2007 |
| WO | 2012161612 A1 | 11/2012 |
| WO | 2013058673 A1 | 4/2013 |

OTHER PUBLICATIONS

Dou, W.B. and Z.L. Sun, "Ray tracing on extended hemispherical and elliptical silicon dielectric lenses," International Journal of Infrared and Millimeter Waves, vol. 15, pp. 1993-2002, No. 1 L, 1995.

Filipovic, D.F. et al., "Off-Axis Properties of Silicon and Quartz Dielectric Lens Antennas", IEEE Trans. On Antennas and Propagation, vol. 45, No. 5, pp. 760-766, May 1997.

Filipovic D F et al: "Double-slot Antennas on Extended Hemispherical and Elliptical Silicon Dielectric Lenses", IEEE Transactions on Microwave Theory and Techniques, IEEE Service Center, Piscataway, NJ, US, vol. 41, No. 10, Oct. 1, 1993. pp. 1738-1749, ISSN: 0018-9480, DOI: 10.1109/22.247919.

Alexey Artemenko et al: "Millimeter-Wave Electronically Steerable Integrated Lens Antennas for WLAN/WPAN Applications", IEEE Transactions On Antennas and Propagation, IEEE Service Center, Piscataway, NJ, US, vol. 61, No. 4, Apr. 1, 2013, pp. 1665-1671, XP011499218, ISSN: 0018-926X, DOI: 10.1109/TAP.2012. 2232266.

Fernandes C A et al: "Shaped Coverage of Elongated Cells At Millimetre Waves Using a Dielectric Lens Antennas", Proceedings of the 25$^{th}$ European Microwave Conference 1995. Bologna, Sep. 4-7, 1995; [Proceedings of the European Microwave Conference], Swanley, Nexus Media, GB, vol. Conf. 25, Sep. 4, 1995, pp. 66-70, XP000740148, ISBN: 978-1-899919-15-4.

* cited by examiner

SYSTEM AND METHOD OF RELAY COMMUNICATION WITH ELECTRONIC BEAM ADJUSTMENT

CROSS-REFERENCE TO RELATED APPLICATIONS

This application is a continuation-in-part of International application No. PCT/RU2011/000814, the content of which is incorporated herein by reference in its entirety.

BACKGROUND OF THE INVENTION

1. Field of the Invention

The present invention generally relates to the field of radio communication technology and, more particularly, to high throughput millimeter-wave point-to-point radio relay communication systems. The present invention represents a system and method of relay communication with electronic beam adjustment. The present invention provides both automatic initial alignment of antenna beam directions of two radio relay stations as well as further adjustment of beam directions to compensate for small antenna orientation changes caused by various factors (such as wind, vibration, different expansion coefficients of the bearing structures at temperature fluctuations, etc).

2. Description of Related Art

Point-to-point radio relay systems are widely used in various transport networks for multiple applications, the most important being backhauling of base station sites for mobile networks. Recent growth of data traffic served by the mobile networks leads to ever growing requirements to the capacity of radio interfaces of the mobile networks and, as a consequence, to the capacity of the exploited backhaul links. The requirements to the capacity of the backhaul for each cellular site are expected to grow in the next several years from the current several Mbps (or even hundreds of Kbps) to hundreds of Mbps or even several Gbps per site.

The growing throughput requirements for radio relays create the necessity for expanding the bandwidth of transmission signal to accommodate extra capacity. Since the available spectrum of frequency bands in use is typically exhausted, exploitation of higher carrier frequency and new spectrum bands is needed. In particular, the millimeter-wave spectrum with the frequencies from 30 GHz to 300 GHz has significant potential for high-capacity backhaul applications and the 71-76 GHz and 81-86 GHz bands have been made available in many countries for fixed point-to-point radio links with no licensing or simplified licensing.

The increase in the operational frequency and signal bandwidth significantly impacts the design of radio backhaul links. The received signal power per Hz of the signal bandwidth needs to be kept the same in comparison with a lower band system to maintain the same spectral efficiency. This leads to a requirement for higher total received power that can be achieved by rising the transmit power or by increasing the gain of transmit and/or receive antennas. The transmit power is typically limited by the regulations that leaves the only option of increasing the antenna gain. At the same time, the well-known Friis transmission equation (H. T. Friis, Proceedings of IRE, vol. 34, p. 254, 1946):

$$\frac{P_r}{P_t} = G_t G_r \left(\frac{\lambda}{4\pi R}\right)^2$$

shows that the received power $P_r$ in free space (that is a valid approximation for a point-to-point radio relay link) is proportional to the gains of the receiver $G_r$ and transmitter $G_t$ antennas, transmit signal power $P_t$ and the squared wavelength $\lambda$ of the carrier frequency and inversely proportional to the squared propagation distance R. Thus moving to a higher frequency band even at the same signal bandwidth also requires increasing the antenna gain at the transmitter and/or receiver in order to maintain the link budget.

A related parameter to the antenna gain is the antenna half power beam width (HPBW) that decreases when the antenna gain grows. Due to the above discussed reasons, typical antenna gains for the millimeter-wave radio relay systems are 40-50 dBi that translates to antenna beam widths in the order of 1 degree and below.

The use of antennas with such narrow beam widths in the radio relay systems leads to additional problems in their operation not occurring in antenna systems with lower carrier frequency and bandwidth. The outdoor units of the relay stations including their antennas are typically mounted close to the base stations on high height constructions such as cell towers or rooftops of high buildings. The cell towers are typically metal constructions that are relatively rigid but still have some swings and deviations (especially of their top part) caused by wind, different expansion coefficients of the bearing structures due to heating/cooling in different hours of a day and other reasons. High buildings are also subject to the same problems (though at a less extent) because of low drifts of their bases that leads to small changes of the building orientations especially closer to the roof level.

Such changes of the orientations of the mounting constructions may lead to loss of the mutual orientation of the transmitter and receiver antennas and failure of the communication link. This problem became now acute for millimeter-wave radio relay systems where the beam widths of the used antennas are about 1 degree or below because of the reasons considered above.

The frequency and typical time scales of the mounting construction orientation variations are very different depending on the cause of the variation and may vary from a fraction of Hz (or even several Hz) for wind induced oscillations, hours for variations due to different heating by the sun of different parts of the construction and up to the years for low drifts of the building bases.

The current attempts to reduce or eliminate these drawbacks include mounting relay systems to lower level structures of cell towers (not on the top) and further to rooftops of buildings and, additionally, manually adjusting antenna's direction in case of slow drifts of their orientations.

Relay Systems for Mobile Networks Backhauling

Relay systems are widely used for mobile networks backhauling. In comparison with traditional fiber optical communication links, radio relay systems benefit from significantly lower installation costs, competitive throughput that has become recently comparable to the throughput of traditional systems. The above mentioned benefits stimulate further research and development of the theoretical and practical aspects of designing efficient millimeter-wave transceivers.

Thus, at present various point-to-point and point-to-multipoint communication systems and modifications thereof for mobile networks backhauling are proposed. In particular, U.S. Pat. No. 7,769,347 titled "Wireless communication system" describes a wireless communication system that provides data communication between a plurality of mobile users with the help of a base station network. Herewith communication links between the base stations are established directly or by the additional communication points in the millimeter-wave band higher than 60 GHz. It should be noted that the authors of the invention pay the most attention to the 71-76 GHz and 81-86 GHz frequency bands which advantages were considered in the current description earlier. It is also mentioned that antenna for the relay station should have narrow beam width and high gain.

U.S. Pat. No. 7,769,347 teaches the importance of antenna beam fine adjustment and describes some methods of beam adjustment.

Adjustment methods disclosed therein include mechanical scanning of different reflector antennas and electronic beam scanning in phased antenna arrays. The use of phased antenna arrays is however impractical nowadays for the millimeter-wave relay systems due to the very large antenna elements number requirement. The above mentioned modern methods of mechanical scanning include rotation of the whole antenna using precise mechanisms, movement or rotation of primary antenna elements of the reflectors, movement of the secondary comparatively small reflector of, for example, Cassegrain antenna, usage of multi-aperture antennas together with the array of switched antenna elements and are far from being optimal. All methods of mechanical scanning are comparatively slow and can require the manual work using qualified staff.

Relay stations are also disclosed, for example, in US Patent Application No 20080153549 titled "Wireless millimeter wave communication system". In particular, this patent application describes full duplex transceiver for relay system operating in the considered frequency bands of 71-76 GHz and 81-86 GHz wherein the antenna is a lens antenna with a primary horn feed antenna element. Utilization of the lens antenna in this case provides lower side lobe level of the antenna radiation pattern comparing with the traditional for millimeter-wave relay stations reflector antennas. The problem of rough and fine mutual antenna beam adjustment is noted in the application description but no new solutions are suggested.

In the prior art, multiple methods for rough and fine antenna beam direction adjustment are disclosed. Rough adjustment is performed using some simple but precise optical devices, for example, an optical or laser sight. Fine adjustment may be performed by one of various proposed methods. Some of these methods include additional equipment and devices such as a power detector for received signal power estimation, other methods use common operation mode of the transceiver. For example, a method disclosed in U.S. Pat. No. 7,501,982 entitled "Antenna alignment method" is based on maximization of the link budget depending on the antenna orientation. It is further noted in the description of U.S. Pat. No. 7,501,982 that antenna rotation is performed either manually by the personnel or by a special motor device.

Systems and Methods for Remote Antenna Adjustment

One proposed solution to the problem of antenna beam positioning is remote antenna beam direction adjustment and tracking, which is advantageous in many cases. Remote adjustment allows performing antenna beam adjustment and tracking in automatic manner without long connection failure.

A remote antenna positioning system is disclosed in U.S. Pat. No. 7,642,961 entitled "Remote control antenna positioning system". The positioning system described therein is based on the use of electrical precise motor for antenna rotation in 3-D space and is controlled remotely. However, this system requires the use of expensive precise motor technique and a computer system for signal processing controlled by a qualified operator.

Another prior art solution of a method of electronic beam adjustment is disclosed in U.S. Pat. No. 6,587,699 entitled "Narrow beamwidth communication link with alignment camera". This prior art describes a point-to-point communication system that consist of two separated high throughput transceivers with highly directional antennas, each transceiver is equipped with a telescopic camera, and a special processor for processing of the received from cameras images (see FIG. 1). The system described in U.S. Pat. No. 6,587,699 provides not only fine mutual antenna orientation adjustment but also automatic beam directions tracking and tuning in cases of shifts or swings of the relay station mounting construction. The main concept of this system for beam adjustment is receiving some reference images from cameras for which the best signal transmission characteristics are provided. When the beam is deviated from this position the images received from cameras also change. Thus, the beam deviation can be evaluated and corrected in accordance with the received images. A beam adjustment method based on the proposed system is disclosed as well.

However, the system described in U.S. Pat. No. 6,587,699 requires the use of additional expensive equipment integrated into the relay system structure and elaborative work of specially qualified staff in the initial antenna beam adjustment procedure and thus, is expensive.

Also known from GB 2459131 is a communication system comprising two transceivers connected to a main antenna and to a search antenna, and a control unit which controls the two transceivers, including activating and selecting operation modes of the transceivers. The mentioned control unit can lead to low efficiency of electronic beam adjustment and possibility of introducing of mistakes due to the ability to only enlarge the radiation pattern beam at the cost of the antenna gain.

Thus, analysis of the above discussed prior art shows that there still exists the necessity of providing a fully electronic fine beam antenna direction adjustment and tracking that would allow fast connection establishing and recovery, and eliminate the need for manual work using qualified staff.

SUMMARY OF THE INVENTION

An object of the invention is to provide a system for radio relay communication capable of fully automatic electronic adjustment of beam directions to support high data transmission rates with in-process correction and recovery of connection.

The objects set above and other objects are attained by providing a point-to-point millimeter wave communication system with electronically adjustable antennas, the system comprising: a first transceiver system located at a first location, and a second transceiver system located at a second location. The first transceiver system is capable of transmitting to and receiving from the second transceiver system, and the second transceiver system is capable of transmitting to and receiving from the first transceiver system. Each of the transceiver systems comprises a narrow beam directional antenna capable of electronically switching the main beam between at least two directions, and a control module that uses a control algorithm to control the radiation pattern of the antenna on the basis of control information from the respective transceiver system and generates control signals to control the antenna.

The ability to electronic scanning for antenna beam adjustment which allows avoiding the need for additional expensive equipment in the relay system structure (like cameras, power detectors, etc.) and precise mechanical positioning devices (like motors). Advantageously, electronic beam scanning provides a much more simple procedure of initial antenna positioning and automatic tracking and adjustment of the antenna beam directions without long connection failure.

Accordingly, the present invention provides a radio relay station with electronic beam steering antennas capable of automatic antenna orientation readjustment.

Furthermore, the use of the antenna with electronic beam adjustment according to the present invention at some angle ranges allows to significantly simplify accurate initial mutual alignment of two relay station antennas.

It shall be further appreciated that while a system and method of relay communications with electronic adjustment of the beam directions being the object of the current invention, initial antenna positioning and automatic readjustment of the beam directions when needed can be performed by any suitable method known in the art.

In one example embodiment of the present invention, a control module is used in each relay station to provide initial antenna positioning and automatic tracking and adjustment of the antenna beam directions, the said control module implementing antenna radiation pattern control algorithms based on information from relay station and generating control signals for the antenna. It is important that the control module of the present invention generates control signals to control the antenna and not the receiver, and the control module does not switch the mode or activate the transceiver. In other words, usage of the control module provides more effective electronic scheme of electronic beam alignment without the need of any kind of additional search antenna.

Thus, in one example embodiment of the proposed novel technical solution, the radio relay system comprises two spaced apart millimeter-wave transceivers which provide high throughput data transmission and reception in frequency or time division duplex mode, each comprising a high gain antenna capable of electronic scanning in certain continuous angle range, which are controlled by a control module using control algorithms for antenna radiation pattern adjustment.

Various embodiments of the proposed method and system for antenna beam adjustment adapted for particular antenna types and relay systems are also considered within the scope of the present invention.

In still another aspect of the invention, a method for accurate initial beam directions fine adjustment and subsequent beam directions tracking and readjustment when needed is provided.

The above described bidirectional system according to one of the embodiments of the present invention provides data communication line with large data capacity with automatic correction of beam deflections by using electronically adjustable antennas controlled by the control module receiving the control information when necessary during communication process. Further, the novel usage of such electronically adjustable antennas and control module in relay systems allows full automation of the antenna alignment without need of qualified operators.

Preferably, said system is used in a backhaul system for mobile networks and said antennas have a gain greater than 30 dBi.

According to one embodiment of the invention each transceiver system uses the frequency division duplex to divide transmitted and received signals. This provides increasing of data transmission rate and reducing of possible transmission errors.

Preferably, the first transceiver system transmits signals in the 71-76 GHz band and receives signals in the 81-86 GHz band and the second transceiver systems transmits signals in the 81-86 GHz band and receives signals in the 71-76 GHz band. Thus, most promising for data transmission band ranges can be used according to the present invention.

According to another embodiment of the invention separation of each adjacent beam directions for each antenna is equal or lower than a half-power beam width of the antenna. This configuration helps to perform fine alignment of the transceiver systems in a continuous angle range.

According to still other embodiments at least one of said antennas is a parabolic antenna with a switching focal plane array used for electronic beam steering, a Cassegrain antenna with a switching focal plane array used for electronic beam steering, a focusing lens antenna with a switching focal plane array used for electronic beam steering, or an integrated lens antenna with a switchable array mounted on the lens back focal plane surface and used for electronic beam steering.

According to another embodiment of the invention the control module comprises the initial antenna alignment unit configured to perform initial alignment of the antenna of the first transceiver system and the antenna of the second transceiver system in relation to each other, the monitoring unit configured to monitor the predetermined parameters of the relay system and generate a signal for initiating a readjustment, and a readjustment unit configured to readjust the antenna of the first transceiver system and/or the antenna of the second transceiver system in response to said signal. Such configuration of the control module provides well-timed and appropriate initial mutual alignment of the transceivers and further readjustment of the at least one transceiver of the system when needed.

According to another embodiment of the invention said control module of each transceiver system is a programmable microcontroller.

According to another embodiment of the invention the logic of the control module is implemented in the baseband unit of each transceiver system without using additional electronic components.

Also provided is a method for mutual alignment of the antenna of the first transceiver system and the antenna of the second transceiver system of the point-to-point millimeter wave communication system with electronically adjustable antennas, comprising the steps of: sending a signal by the antenna of the first transceiver system in at least one main beam direction of the antenna of the first transceiver system; receiving the signal by the antenna of the second transceiver system in at least one main beam direction of the antenna of the second transceiver system while at least one main beam direction of the antenna of the first transceiver system is unchanged, determining a combination of the main beam directions of the antennas of both transceiver systems such that a predetermined criterion is met; and then applying the determined main beam directions of the antennas to one or both transceiver systems.

This method provides accurate aligning of the antenna main beam directions which can be automatically reestablished using any appropriate criterion in case of any events changing the antenna orientations.

Preferably, all combinations of main beam directions of the antennas of both transceiver systems are tested. This provides enhanced accuracy of the alignment and may prevent some possible errors during operation.

Thus, claimed method provides more accurate and fast antenna direction adjustment by the point-to-point communication system.

According to an embodiment of the invention only main beam directions of the antennas adjacent to the main beam direction used by corresponding transceiver systems prior to the start of the aligning procedure are tested.

According to another embodiment of the invention at least one training sequence known to the second transceiver system is transmitted by the first transceiver system and then received by the second transceiver system to determine the combination of the main beam directions of the antennas of both transceiver systems such that the predetermined criterion is met.

Alternatively, at least one training sequence is transmitted by the first transceiver system so that different training sequences are transmitted from different main beam directions of the antenna and the second transceiver system is capable of finding the main beam direction of the antenna of the first transceiver system by detecting the type of the transmitted training sequence.

According to another embodiment of the invention the second transceiver system informs the first transceiver system about the main beam direction of the antenna of the first transceiver system providing the predefined criterion by sending the index of said direction to the first transceiver system and embedding this information in the data stream transmitted from the second transceiver system to the first transceiver system.

According to still another embodiment of the invention signals used for data transmission from the first transceiver system to the second transceiver system are also used to measure the received power of the second transceiver system and to determine the combination of the main beam directions of the antennas of both transceiver systems such that the predetermined criterion is met.

Preferably, the predetermined criterion is in that the received power of the second transceiver system is maximized. This provides better accuracy of data transmission and less possibility of errors introduced by the system itself.

According to another embodiment of the invention the predetermined criterion is in that the data transmission rate from the first transceiver system to the second transceiver system is maximized.

According to another embodiment of the invention the predetermined criterion is in that a reliable data transmission between the first transceiver system and the second transceiver systems is provided.

According to another embodiment of the invention the method further comprises a step of monitoring the received power level of the second transceiver system and repeatedly carrying out steps of sending the signal, receiving the signal, determining a combination of the main beam directions, and applying the determined main beam directions upon the failure of data transmission between the first and second transceiver systems.

Alternatively, the method further comprises carrying out steps of sending the signal, receiving the signal, determining a combination of the main beam directions, and applying the determined main beam directions regularly after transmission of 1 or more data packets.

Alternatively, the method further comprises carrying out steps of sending the signal, receiving the signal, determining a combination of the main beam directions, and applying the determined main beam directions regularly after expiration of a predetermined time interval.

According to another embodiment of the invention, the second transceiver system monitors if the data is successfully transmitted from the first transceiver system to the second transceiver system and wherein the method further comprises carrying out steps of sending the signal, receiving the signal, determining a combination of the main beam directions, and applying the determined main beam directions upon either consecutive reception by the second transceiver system of 1 or more incorrect data packets or loss of synchronization between the first transceiver system and the second transceiver system.

Alternatively, the second transceiver system monitors the received power level and wherein the method further comprises carrying out steps of sending the signal, receiving the signal, determining a combination of the main beam directions, and applying the determined main beam directions upon the decrease of the power received by the second transceiver system below the predetermined threshold.

Preferably, the measured received power is first averaged over 10 minutes or more and then the averaged value is compared with the predetermined threshold.

Further aspects and features of the present invention can be appreciated from the appended drawings and the written description.

DETAILED DESCRIPTION

The present invention relates to transceivers for a point-to-point millimeter wave communication system with electronically adjustable antennas, to point-to-point millimeter wave communication systems with electronically adjustable antennas consisting of a plurality of the mentioned transceivers, and to methods for mutual alignment of antennas in a point-to-point millimeter wave communication system with electronically adjustable antennas.

According to one embodiment of the claimed invention, highly directive antennas are used in each of the relay system transceivers. The highly directive antennas are capable of electronically switch between beam directions in a continuous angle range wider than the antenna beam width. Herewith the electronic scanning can be provided in different antenna types such as reflector antennas, lens antennas, integrated lens antennas, etc. The antennas should be designed to provide switching between feed antenna elements in the array located in the focal plane of the main reflector or the lens thus forming a radiation pattern beam in different directions.

Figure 1:
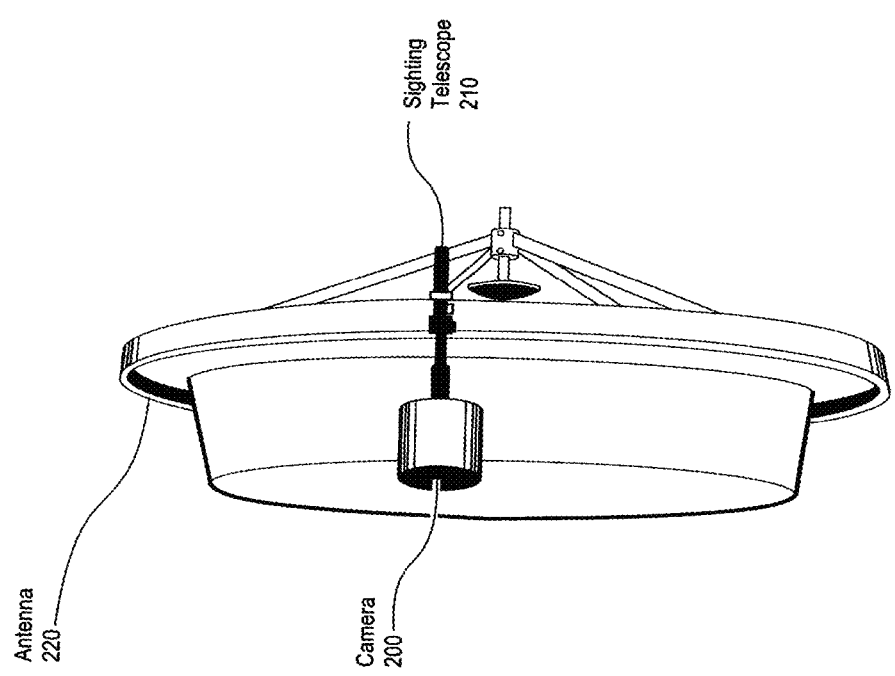
FIG. 1 illustrates beam directions adjustment of Cassegrain antenna in the relay system of the prior art.
Figure 1:
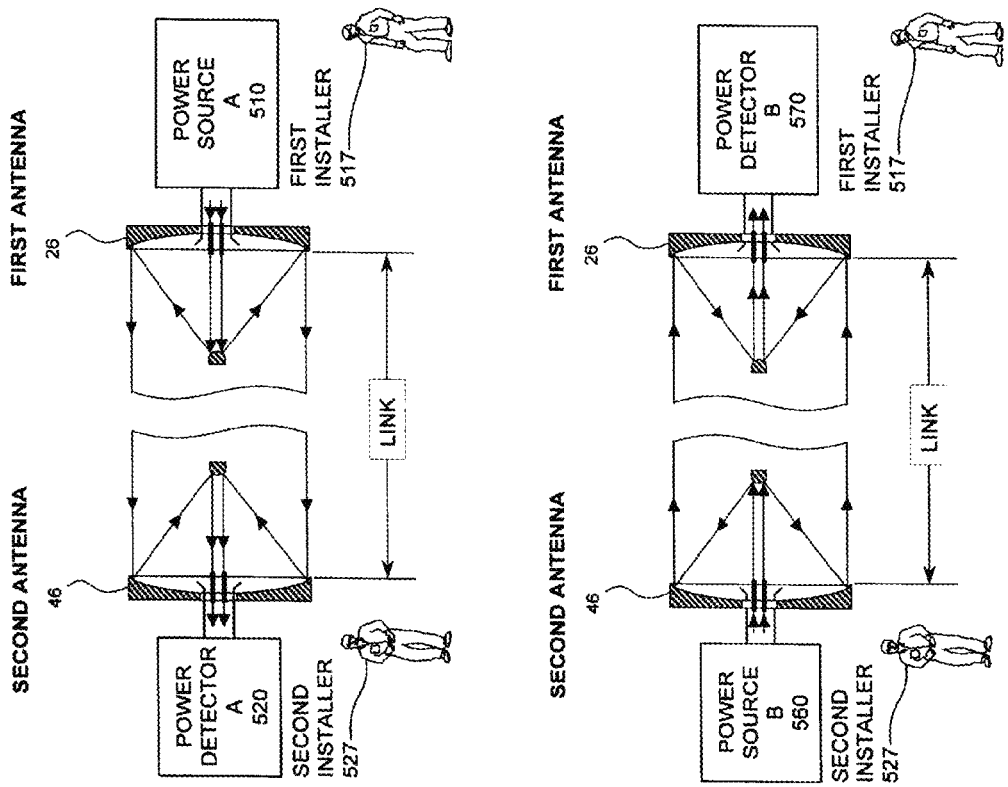
Figure 2:
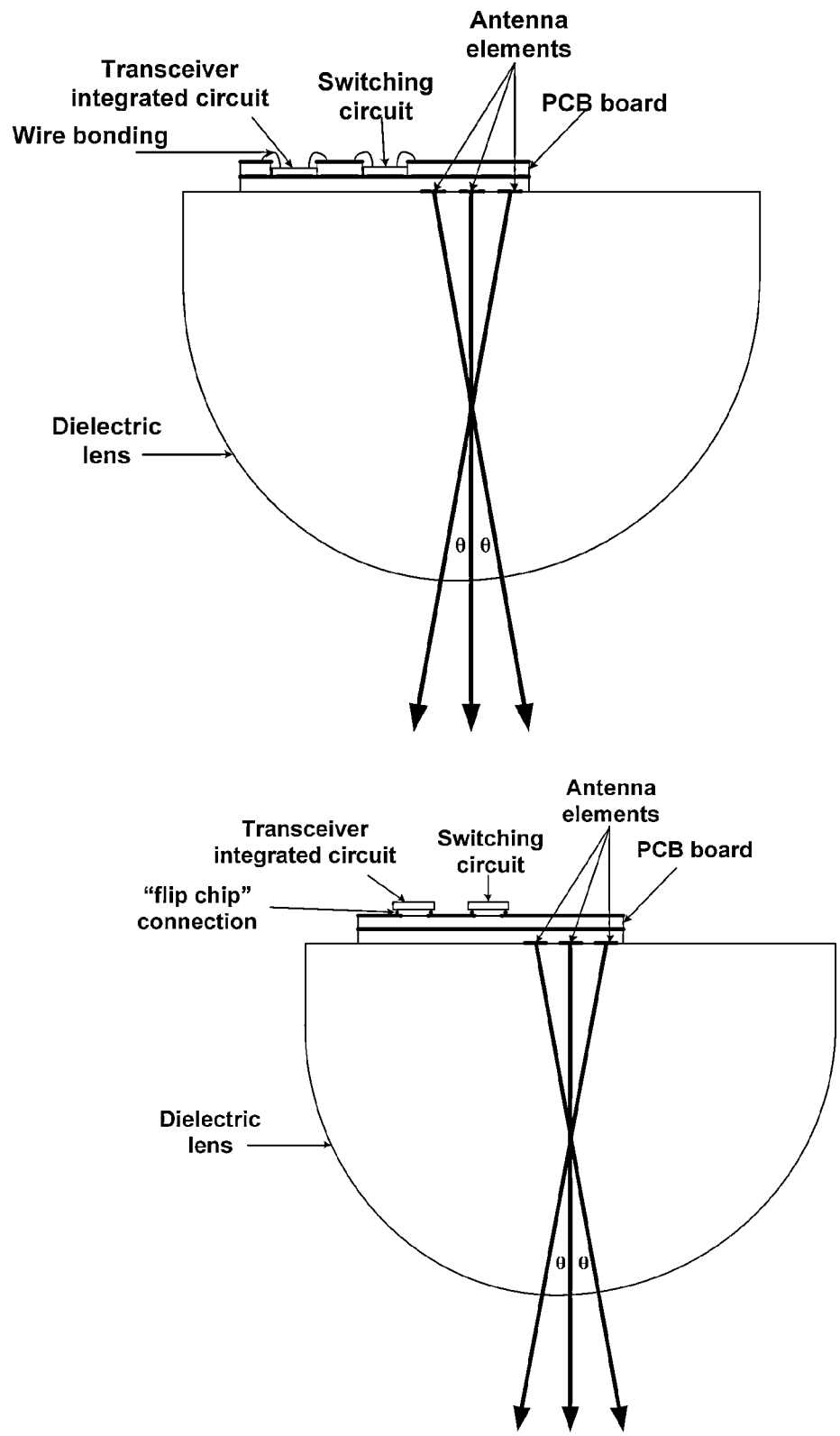
FIG. 2 shows the structure of the steerable integrated lens antenna.

One of the most advantageous types of antennas for use in the proposed relay system is a scanning integrated lens antenna that consists of dielectric lens of elliptical or quasi elliptical form and integrated on the back (plane) focal surface array of switchable feed antenna elements. Example structures of the integrated lens antenna are shown in FIG. 2. This antenna structure is the most compatible with mass production technologies for fabrication of planar antenna elements on printed circuits boards and with semiconductor technologies used in transceivers and switching circuits up to millimeter-wave band. Such integration provides minimum cost and maximum efficiency of the relay station in mass production.

Figure 3:
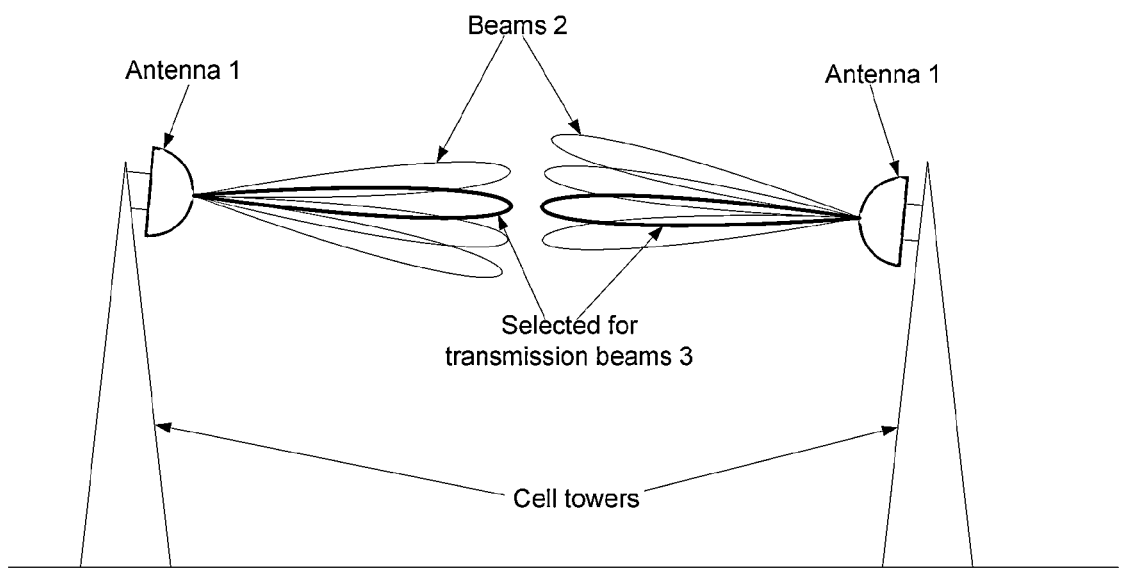
FIG. 3 is a schematic view of the relay system antennas with electronic beam adjustment.

The main principle of antenna beam direction selection for two relay stations is illustrated in FIG. 3. This figure schematically shows two antennas 1 mounted on cell towers 4 of the mobile network and a number of available beams 2 intersecting at a predetermined level. Beam directions 3 selected for the most effective signal transmission and reception according to chosen criteria are shown by red lines. In one of the embodiments the beam directions are spaced apart such that the angular distance between adjacent beam directions for each antenna is equal or less than a half-power beam width of the antenna.

Figure 4:
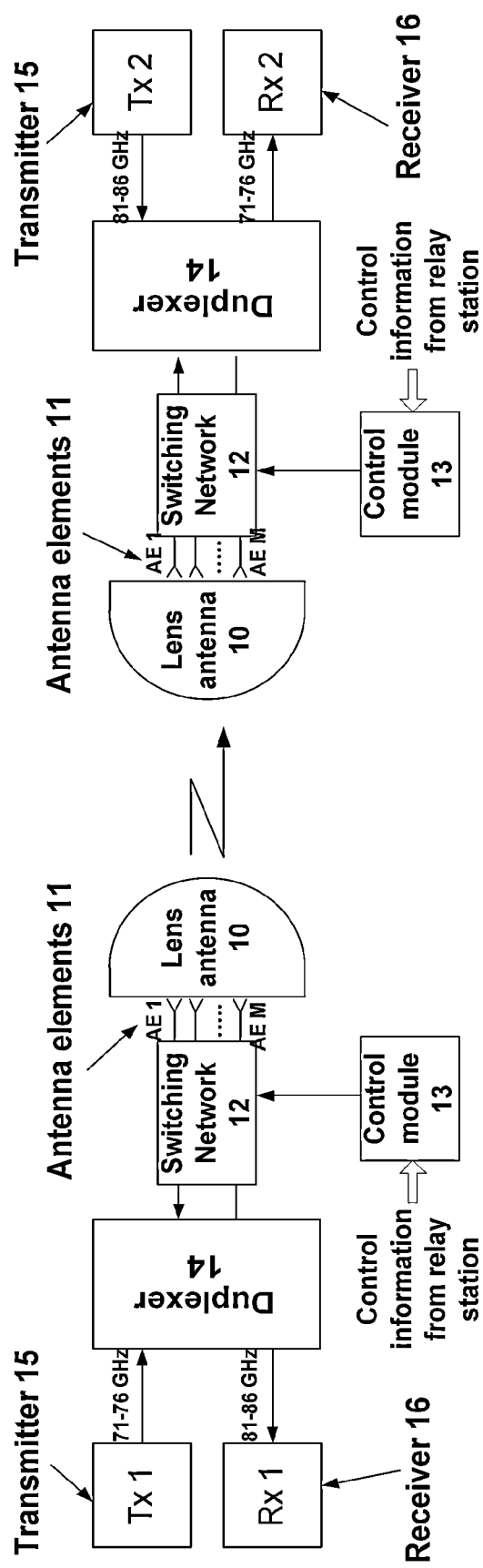
FIG. 4 illustrates the structure of the relay system operating in frequency duplex mode with steerable integrated lens antennas.

The proposed relay system in one of the most preferred embodiment provides full frequency duplex communication in the promising frequency bands of 71-76 GHz and 81-86 GHz for which in many countries licensing is not required or simplified licensing procedure is established. The structure of the proposed relay system according to one of the preferred embodiments operating in frequency duplex mode with steerable integrated lens antennas is shown in FIG. 4. The main functional blocks of each relay station in the proposed system are lens antenna 10, an array of switchable antenna elements 11 integrated on the lens, switching circuit 12, control module 13, duplexer 14, transmitter 15 and receiver 16. One of the relay stations transmits a signal in the 71-76 GHz band and receives a signal in the 81-86 GHz band and the second station transmits a signal in the 81-86 GHz band and receives a signal in the 71-76 GHz band. In this case duplexer 14 provides the isolation between the transmitter and receiver in each relay station. It shall be appreciated that antenna 10 may represent another type of steerable antenna, for example, a parabolic antenna, a Cassegrain antenna or a lens antenna with a switchable array in a focal plane.

According to the above described embodiment of the relay system, the control module 13 implements antenna radiation pattern control algorithms. The control module receives input data from a baseband unit of the relay system (level of the signal power and maximum data transmission rate for a relay communication) and/or from a network device located in the network topology after the relay link and configured to measure data transmission rate and working efficiency of the relay link. As an output data the control module outputs a signal defining a selection of an appropriate position of the antenna at the examined relay station. The control module can also generate instructions for obtaining an optimal direction of the antenna located at the opposite side of the relay link. For signaling an index of the optimal direction of the antenna to the opposite end of the relay link the control module can be connected with the baseband unit of the relay system (if it supports the function of sending the index) or with the network device after the relay station.

Additionally control module can have network connection for remote managing and monitoring of the relay system performance.

From a hardware implementation standpoint the required control module can be constructed using different hardware platforms. Since computational costs of the electronic beam scanning algorithms are not high than the most preferred implementation of the control module bases on a programmable microcontroller. The control module can have units performing the operations of the initial alignment of antennas, monitoring the predetermined parameters of the relay system, and readjustment of antennas when necessary. In another embodiment the control module logic can be implemented in each relay station baseband unit without using additional electronic components.

The claimed relay system capable of electronic beam direction adjustment allows to significantly simplify and speed up the initial antennas adjustment in the relay transceivers and also provides automatic recovery of failed connection in case of relay station orientation changes due to influence of different effects (wind, vibration, different intensity of heating of bearing structures in different hours of a day and other reasons). Oppositely, the relay system with electronic beam adjustment allows mounting transceivers in the most effective locations (the highest parts of the cell towers, rooftops of the high buildings) despite larger and more frequently arisen shifts of the bearing structures.

In some embodiments, the claimed relay system can comprise antennas with a gain greater than 30 dBi and may be used, without limitation, in backhaul systems for mobile networks, data communication systems, and others.

For automatic compensation for the deviations of the antenna directions, the radio relay system implements a method of beamforming and determining an optimal combination of the directions of the antennas at the two stations. The electronic beam direction adjustment allows exploiting different methods of such adjustment which are also a subject of the proposed invention.

Criteria for optimization (selection) of the antennas directions may be different. The most relevant criterion is the level of the power received by a corresponding relay station. However, the received signal power may not always be available to the antenna steering algorithm. For example, such situation may be the case when a lens antenna is used as an external antenna to the relay station (and can be used interchangeably with a fixed non-steerable antenna) and when the steering algorithm does not have access to internal parameters of the relay station, such as received signal power. In such cases, other criteria, such as throughput provided by the relay link or availability of data transmission over the link (i.e. link presence or failure), may be used instead of received signal power.

To determine optimal combinations of antenna beam directions, different levels of received signal power (or another objective parameter as described above) are tested and the combination maximizing the objective parameter is selected. One approach to this search may be performing an exhaustive search by testing all the combinations of the main beam directions of two antennas. In another embodiment, the testing is performed only for the beam directions that are adjacent to the directions used by the relay system for data transmission prior to the start of the beamforming process. General flowchart of the proposed method of beam directions adjustment for relay station antennas is shown in FIG. 5.

Figure 5:
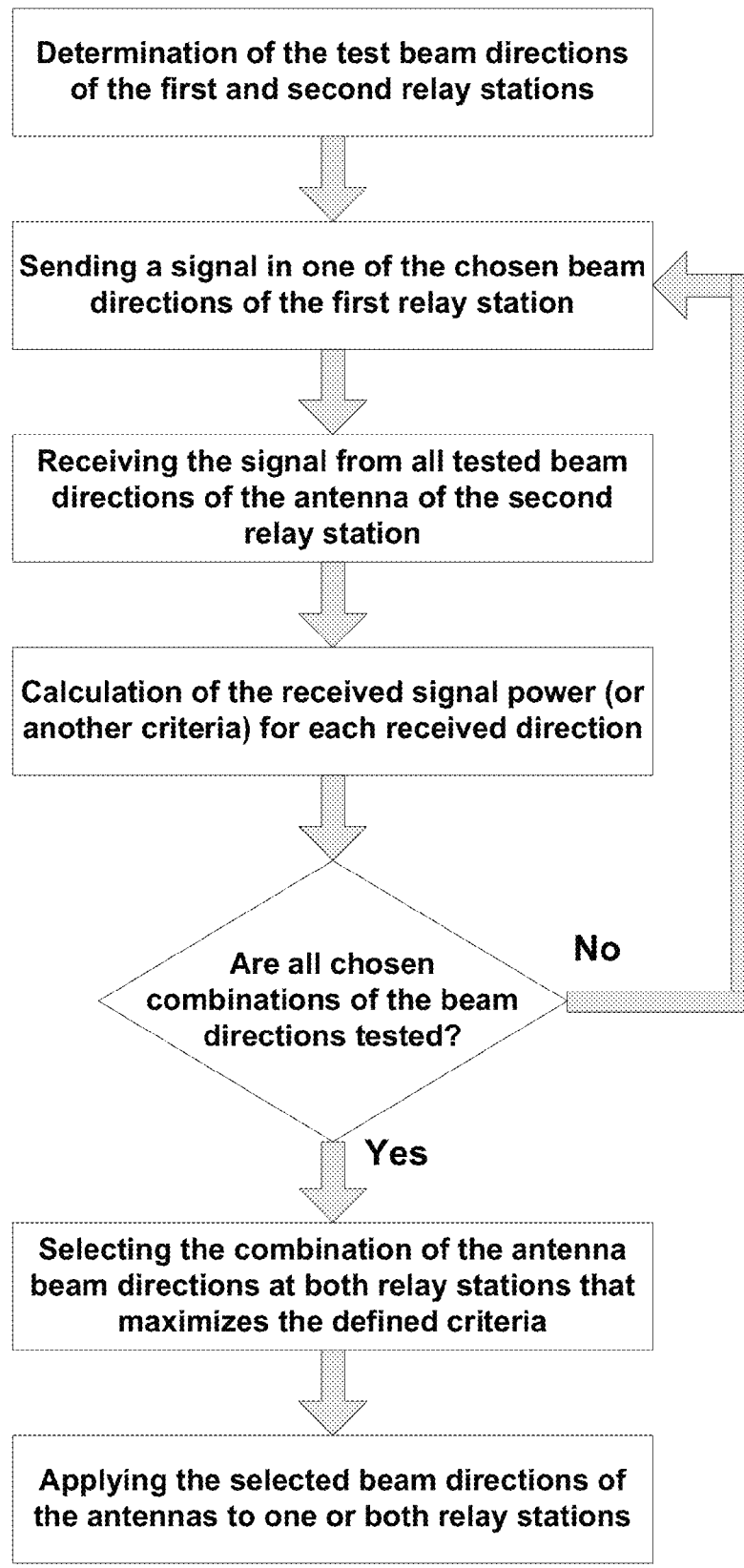
FIG. 5 is a flowchart of the method of beam directions adjustment for relay station antennas according to one embodiment.

As illustrated in FIG. 5, the method for aligning antenna beam directions of two relay stations in general comprises the following steps: A) sending a signal by the antenna of the first relay station from a set of main beam directions of the antenna of the first relay station, B) receiving the signal by the antenna of the second relay station from a set of main beam directions of the antenna of the second relay station for each beam direction of the antenna of the first relay station, C) determining a combination of main beam directions of the antennas of both relay stations such that a predetermined criterion is met (for example, the received power of the second relay station is maximized), and then D) applying the determined main beam directions of the antennas to one or both relay stations. All mentioned steps of the method may be performed each time after transmission of one or more data packets, or after the expiration of a predetermined time interval.

To perform the procedure of beam direction search and beamforming using the measured level of the received signal power, one relay station of the link may send special training signals that are recognizable by the second station and thus can facilitate measurement of the level of the received signal power by the second station to provide more accurate results of the measurements or accomplish the measurements in a less time. This facilitates determining a combination of the main beam directions of the antennas of both relay stations such that the predetermined criterion is met. For example, the predetermined criterion may consist in maximization of the received power of the second relay station, maximization of the data throughput from the first relay station to the second relay station, or providing a reliable data transmission between the first relay station and the second relay station. The training signals can comprise training sequences, for example, in the form of bit sets or in the form of complex data samples. The training signals may differ for different antenna directions of the transmitter antenna to help the receiver station to identify the transmission direction currently in use to further feed the index of this direction back to the transmitter station. The feedback information may be conveyed by the same channel as used for the data transmission by embedding this information in the data stream.

The indices of the optimal combination of the transmitter and receiver antenna directions identified from the beamforming procedure are used by the relay stations to determine the corresponding directions of the antennas. The determined antenna steering directions are applied for both the transmitting and receiving operations of each station (i.e. are used for duplex transmission) though the beamforming training described above is performed only for one transmission direction. The optimality of the determined combination of the antenna directions either rely on the reciprocity of the propagation channel or, alternatively, only the antenna direction for the station being at the receiver during training procedure is applied but the antenna direction for the second station is determined by performing training in the opposite transmission direction.

Start of the beamforming procedure may be activated regularly, for example, before transmitting every packet, or after transmission of some predefined number of packets, or at every time interval of some predefined duration.

Alternatively, for relatively small deviations of the antenna beam directions, it may be preferable to start the procedure of beam direction search and beamforming as the need arose which is caused by some event. The two most relevant events are degradation of the received signal power below some predefined level or failure of the communication link (either consecutive unsuccessful reception by the relay station of several data packets or loss of the synchronization of the link). Thus, a method according to the invention may also include monitoring the received power level of the second relay station, and repeatedly performing steps A)-D) upon the failure of data transmission between the first and second relay stations. In case of monitoring the received power level the method includes performing steps A)-D) upon the decrease of the power received by the second relay station below the predetermined threshold.

In one embodiment the second relay station monitors if the data is successfully transmitted from the first relay station to the second relay station. In this case, upon either consecutive reception by the second relay station of one or more incorrect data packets or loss of synchronization between the first relay station and the second relay station the method comprises carrying out all mentioned steps A)-D).

For the latter case, the received power fluctuation (degradation) or failure of the communication link may be caused by a different reasons related not only to misalignment of the antennas. The most common reason may be raining or snowing that typically leads to strong attenuation of the received signal power. Thus, it is desirable for the relay transceivers to be capable of distinguishing between the reasons of the link degradation to start the antenna beam adjustment procedure only in the case the degradation is occurred due to the antennas losing their orientations. One way to implement such a distinguishing function is to perform averaging of the received signal power over the time. This is useful also to identify the slow deviations like those caused by the building foundations movement. In this case, the averaging of the received signal power should be done over time intervals longer than a typical rain or snowfall duration. The sufficient time interval is estimated to be equal to the duration of one or several days. In another embodiment the measured received power is first averaged over 10 minutes or more and then the averaged value is compared with the predetermined threshold.

This invention is not limited to the specific embodiments disclosed herein which are intended to be illustrative and it covers all modifications and alternatives coming within the scope and spirit of the invention as defined in the attached claims.

The invention claimed is:

1. A transceiver for a point-to-point millimeter wave communication system providing a link, the transceiver comprising
    an electronically adjustable narrow beam directional antenna capable of electronically switching a main beam of the antenna between at least two directions,
    a measuring unit for measuring performance parameters of the link, and
    a control module that controls radiation pattern of the antenna on the basis of performance parameters of the link measured by the measuring unit and that generates control signals to control the radiation pattern of the antenna,
    wherein the control module generates instructions for obtaining an optimal direction of an antenna of another transceiver located at an opposite side of the link, and the transceiver transmits to the another transceiver located at the opposite side of the link a signal with instructions for obtaining an optimal direction of the antenna of the another transceiver.

2. A transceiver according to claim 1, wherein measuring unit is implemented as a baseband unit.

3. A point-to-point millimeter wave communication system providing a link, the system comprising:
    a first transceiver located at a first location, and
    a second transceiver located at a second location,
    wherein the first transceiver is capable of transmitting and receiving a signal from the second transceiver, and the second transceiver is capable of transmitting and receiving a signal from the first transceiver,
    wherein the first transceiver comprises
        an electronically adjustable first narrow beam directional antenna capable of electronically switching a main beam of the first antenna between at least two directions, and
        a first measuring unit for measuring performance parameters of the relay-link and forwarding them to a first control module of the first transceiver,
        wherein the first control module controls radiation pattern of the first antenna on the basis of performance parameters of the link and generates first control signals to control the radiation pattern of the first antenna, wherein the second transceiver comprises an electronically adjustable second narrow beam directional antenna capable of electronically switching a main beam of the second antenna between at least two directions, and a second measuring unit for measuring performance parameters of the link and forwarding them to a second control module of the second transceiver, wherein the second control module controls radiation pattern of the second antenna on the basis of performance parameters of the relay-link and generates second control signals to control the radiation pattern of the second antenna, wherein the first control module generates instructions for obtaining an optimal direction of the second antenna, and the first transceiver is capable of transmitting to the second transceiver a signal with the instructions for obtaining an optimal direction of the second antenna, wherein the second control module generates instructions for obtaining an optimal direction of the first antenna, and the second transceiver is capable of transmitting to the first transceiver a signal with the instructions for obtaining an optimal direction of the first antenna.

4. The system according to claim 3, wherein each of the first and the second transceivers operates in frequency division duplex mode to divide transmitted and received signals.

5. The system according to claim 3, wherein separation of each adjacent beam directions for each of the first and the second antennas is equal or less than a half-power beam width of the mentioned antenna.

6. The system according to claim 3, wherein at least one of said antennas is an integrated lens antenna with a switchable array mounted on the lens back focal plane surface and used for electronic beam steering.

7. The system according to claim 3, wherein each of the first and the second control modules comprises an initial antenna alignment unit configured to perform initial alignment of the first antenna of the first transceiver and the second antenna of the second transceiver in relation to each other, a monitoring unit configured to monitor predetermined parameters of the system and generate a signal for initiating a readjustment, the signal based on the monitored predetermined parameters, and a readjustment unit configured to readjust the first antenna of the first transceiver and/or the second antenna of the second transceiver in response to the signal for initiating a readjustment.

8. A method for mutual alignment of an antenna of a first transceiver and an antenna of a second transceiver of a point-to-point millimeter wave communication system providing a link, the system comprising:

a first transceiver located at a first location, and a second transceiver located at a second location, wherein the first transceiver is capable of transmitting and receiving a signal from the second transceiver, and the second transceiver is capable of transmitting and receiving a signal from the first transceiver, wherein the first transceiver comprises an electronically adjustable first narrow beam directional antenna capable of electronically switching a main beam of the first antenna between at least two directions, and a first measuring unit for measuring performance parameters of the link and forwarding them to a first control module of the first transceiver, wherein the first control module controls radiation pattern of the first antenna on the basis of performance parameters of the link and generates first control signals to control the radiation pattern of the first antenna, wherein the second transceiver comprises an electronically adjustable second narrow beam directional antenna capable of electronically switching a main beam of the second antenna between at least two directions, and a second measuring unit for measuring performance parameters of the link and forwarding them to a second control module of the second transceiver, wherein the second control module controls radiation pattern of the second antenna on the basis of performance parameters of the relaylink and generates second control signals to control the radiation pattern of the second antenna, the method comprising the steps of:

sending a signal by the first antenna of the first transceiver in at least one main beam direction of the first antenna of the first transceiver;

receiving the signal by the second antenna of the second transceiver in at least one main beam direction of the second antenna of the second transceiver while maintaining the at least one main beam direction of the first antenna of the first transceiver unchanged;

determining the main beam direction for each of the first and the second antenna of both transceivers such that a predetermined criterion is met, wherein the first control module generates instructions for obtaining an optimal direction of the second antenna, and the first transceiver is capable of transmitting to the second transceiver a signal with the instructions for obtaining an optimal direction of the second antenna, and the second control module generates instructions for obtaining an optimal direction of the first antenna, and the second transceiver is capable of transmitting to the first transceiver a signal with the instructions for obtaining an optimal direction of the first antenna; and applying the determined main beam directions to one or both of the first and the second antennas.

9. The method according to claim 8, wherein only main beam directions of the antennas adjacent to the main beam direction used by each of the first and second transceivers prior to the start of the aligning procedure are tested.

10. The method according to claim 8, wherein at least one training sequence recognizable by the second transceiver is transmitted by the first transceiver, wherein the said training sequence is used to determine a combination of the main beam directions of the antennas of both transceivers such that the predetermined criterion is met.

11. The method according to claim 10, wherein at least one training sequence is transmitted by the first transceiver so that different training sequences are transmitted from different main beam directions of the first antenna and the second transceiver is capable of finding the main beam direction of the first antenna of the first transceiver by detecting the type of the transmitted training sequence.

12. The method according to claim 8, wherein the second transceiver informs the first transceiver about the main beam direction of the first antenna of the first transceiver providing the predetermined criterion by sending the index of said direction to the first transceiver and embedding this information in the data stream transmitted from the second transceiver to the first transceiver.

13. The method according to claim 8, wherein signals used for data transmission from the first transceiver to the second transceiver are further used to measure the received power of the second transceiver and to determine the combination of the main beam directions of the antennas of both transceiver such that the predetermined criterion is met.

14. The method according to claim 8, wherein the predetermined criterion is maximizing the received power of the second transceiver.

15. The method according to claim 8, wherein the predetermined criterion is maximizing the data transmission rate from the first transceiver to the second transceiver.

16. The method according to claim 8, wherein the predetermined criterion is reliable data transmission between the first transceiver and the second transceiver.

17. The method according to claim 8, wherein the method further comprises a step of monitoring the received power level of the second transceiver and repeatedly carrying out steps of sending a signal, receiving the signal, determining a combination of the main beam directions, and applying the determined main beam directions upon the failure of data transmission between the first and second transceivers.

18. The method according to claim 8, wherein the method further comprises carrying out steps of sending a signal, receiving the signal, determining a combination of the main beam directions, and applying the determined main beam directions regularly after transmission of one or more data packets.

19. The method according to claim 8, wherein the method further comprises carrying out steps of sending a signal, receiving the signal, determining a combination of the main beam directions, and applying the determined main beam directions regularly after expiration of a predetermined time interval.

20. The method according to claim 8, wherein the second transceiver monitors if the data is successfully transmitted from the first transceiver to the second transceiver and wherein the method further comprises carrying out steps of sending a signal, receiving the signal, determining a combination of the main beam directions, and applying the determined main beam directions upon either consecutive reception by the second transceiver of one or more incorrect data packets or loss of synchronization between the first transceiver and the second transceiver.

21. The method according to claim 8, wherein the second transceiver monitors the received power level and wherein the method further comprises carrying out steps of sending a signal, receiving the signal, determining a combination of the main beam directions, and applying the determined main beam directions upon the decrease of the power received by the second transceiver below the predetermined threshold.

22. The method according to claim 21, wherein the measured received power is first averaged over 10 minutes or more and then the averaged value is compared with the predetermined threshold.

\* \* \* \* \*